United States Patent
Sakai (10) Patent No.: US 7,350,860 B2
(45) Date of Patent: Apr. 1, 2008

(54) HEADREST APPARATUS

(75) Inventor: Morio Sakai, Toyota (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 11/636,590

(22) Filed: Dec. 11, 2006

(65) Prior Publication Data
US 2007/0145796 A1    Jun. 28, 2007

(30) Foreign Application Priority Data
Dec. 26, 2005    (JP) .............................. 2005-373024

(51) Int. Cl.
B60N 2/427    (2006.01)
(52) U.S. Cl. ............................................. 297/216.12
(58) Field of Classification Search ............ 297/216.12
See application file for complete search history.

(56) References Cited

U.S. PATENT DOCUMENTS

| | | | |
|---|---|---|---|
| 5,975,637 A * | 11/1999 | Geuss et al. ................ | 297/391 |
| 6,213,548 B1 * | 4/2001 | Van Wynsberghe et al. ..... | 297/216.12 |
| 6,607,242 B2 * | 8/2003 | Estrada et al. ........ | 297/216.12 |
| 6,623,073 B2 * | 9/2003 | Schafer et al. ........ | 297/216.12 |
| 6,761,403 B2 | 7/2004 | Pal et al. | |
| 6,830,278 B2 | 12/2004 | Yoshizawa et al. | |
| 6,890,028 B2 * | 5/2005 | Pal et al. ................ | 297/216.12 |
| 7,048,334 B2 * | 5/2006 | Pal et al. ................ | 297/216.12 |
| 7,073,856 B2 * | 7/2006 | Akaike et al. ......... | 297/216.12 |
| 2006/0186713 A1 * | 8/2006 | Breed .................... | 297/216.12 |

FOREIGN PATENT DOCUMENTS

| | | |
|---|---|---|
| JP | 2000-211410 A | 8/2000 |
| JP | 2003-54343 A | 2/2003 |
| JP | 2004-9891 A | 1/2004 |

* cited by examiner

*Primary Examiner*—Peter R. Brown
(74) *Attorney, Agent, or Firm*—Buchanan, Ingersoll & Rooney PC (57) ABSTRACT

A headrest apparatus comprising a headrest rear portion supported at a seatback, a headrest front portion movable between a fully retracted position and a fully expanded position, a driving means moving the headrest front portion, an capacitance sensor outputting a detection signal representing an capacitance, a controller moving the headrest front portion toward the fully expanded position and controlling the driving means to stop the headrest front portion, a load sensor detecting a load applied to the headrest front portion, and the controller judging a completion of a protection of the head of the occupant on the basis of the load detected by the load sensor in a condition where the headrest front portion is stopped and controlling the driving means to move the headrest front portion toward the fully retracted position when a completion of the protection of the head of the occupant is determined.

9 Claims, 5 Drawing Sheets

HEADREST APPARATUS

This application is based on and claims priority under 35 U.S.C. § 119 to Japanese Patent Application 2005-373024, filed on Dec. 26, 2005, the entire content of which is incorporated herein by reference.

FIELD OF THE INVENTION

The present invention relates to a headrest apparatus provided at a seat for a vehicle such as an automobile.

BACKGROUND

When an impact from a backside is applied to a vehicle in a condition where an occupant is not leaned on a seatback, a head of the occupant rapidly moves toward a headrest with a rapid movement of an upper body of the occupant toward the seatback. On this occasion, a moving distance of the upper body of the occupant differs from a moving distance of the head of the occupant. More specifically, the head of the occupant moves further toward the backside of the vehicle than the upper body of the occupant. Then, the upper body of the occupant is swung by a large amount forward on the rebound of the impact. At this time, a neck of the occupant is strained because of a difference between the moving distance of the upper body and the head.

A headrest apparatus, which moves the headrest to a position of the head of the occupant when the impact from the backside is applied to the vehicle, is respectively disclosed in JP2000-211410A and JP2003-54343A. With such a configuration, the head of the occupant is prevented from being moved by a large amount backward and is protected in a condition where the impact from the backside is applied to the vehicle. Accordingly, a burden to the neck of the occupant can be reduced.

According to the headrest apparatuses disclosed in JP2000211410A and JP200354343A, the head of the occupant is protected by temporally stopping the headrest after moving the headrest to the position of the head of the occupant. A time required for protecting the head of the occupant by the headrest depends on an impact speed, an impact force applied to the vehicle, a posture of the occupant, or the like. Therefore, the head of the occupant can reliably be protected when the time for protecting the head of the occupant is set longer. However, in such a condition, the headrest, which is protruded forward, may hinder a driving ability of the occupant whose head has already been protected.

The present invention has been made in view of the above circumstances, and provides a headrest apparatus which protects a head of an occupant without hindering a driving ability of the occupant because of a front portion of a headrest.

SUMMARY OF THE INVENTION

According to an aspect of the present invention, a headrest apparatus, comprising a headrest rear portion supported at a seatback, a headrest front portion movable between a fully retracted position, which is close to the headrest rear portion, and a fully expanded position, which is distant from the headrest rear portion, a driving means moving the headrest front portion in a retracting or an expanding direction, an capacitance sensor provided at the headrest front portion and outputting a detection signal representing an capacitance variable in response to an approach of a head of an occupant to the headrest front portion, a controller moving the headrest front portion toward the fully expanded position on the basis of a trigger signal and controlling the driving means to stop the headrest front portion when the head of the occupant is detected on the basis of the detection signal of the capacitance sensor, a load sensor detecting a load applied to the headrest front portion in response to a contact of the head of the occupant with the headrest front portion, and the controller judging a completion of a protection of the head of the occupant by the headrest front portion on the basis of the load detected by the load sensor in a condition where the headrest front portion is stopped and controlling the driving means to move the headrest front portion toward the fully retracted position when a completion of the protection of the head of the occupant is determined.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
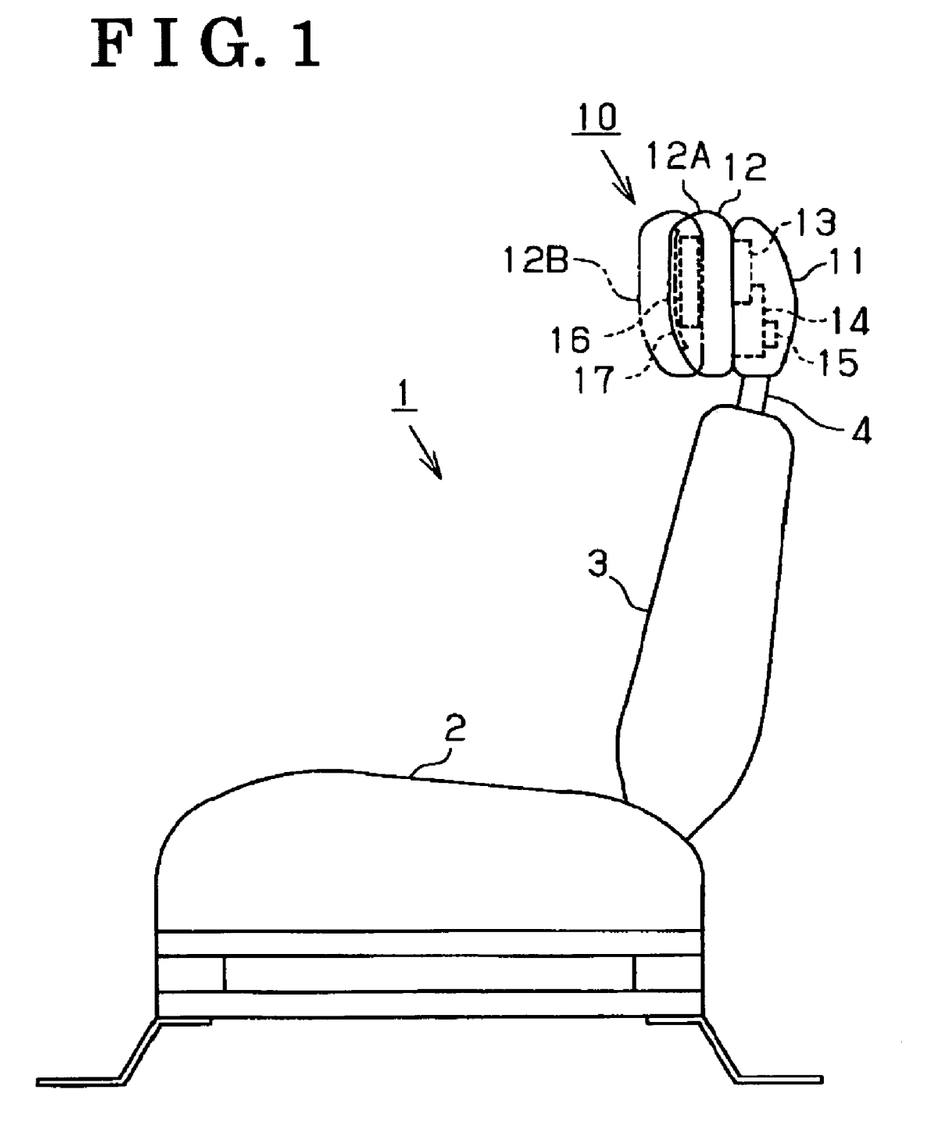
FIG. 1 is a side view of a vehicle seat for explaining a headrest apparatus according to an embodiment of the present invention.

An embodiment of the present invention will be explained with reference to the attached drawings. Illustrated in FIG. 1 is a side view of a vehicle seat 1 to which a headrest apparatus of the present invention is mounted. The vehicle seat 1 is applied to a passenger seat of the vehicle such as an automobile, or the like. As illustrated in FIG. 1, The vehicle seat 1 includes a seat cushion 2, a seatback 3 pivotally supported at the seat cushion 2, and a headrest apparatus 10 supported relative to the seatback 3.

The headrest apparatus 10 includes a headrest rear portion 11 and a headrest front portion 12. The headrest rear portion 11 is supported by a headrest stay 4 provided at an upper end portion of the seatback 3. The headrest front portion 12 can be moved forward and backward relative to the headrest rear portion 11. More specifically, the headrest front portion 12 is movable between a fully retracted position 12A, which is close to the headrest rear portion 11 as indicated by a solid line in FIG. 1, and a fully expanded position 12B, which is away from the headrest rear portion 11 as indicated by a chain double-dashed line in FIG. 1. Under a normal driving of the vehicle, the headrest front portion 12 is placed at the fully retracted position 12A.

The headrest apparatus 10 further includes a controller 13 (i.e., an ECU), an extendable mechanism 14 including a motor 15 serving as a driving means, an capacitance sensor 16, and a load sensor 17. The extendable mechanism 14 moves the headrest front portion 12 forward and backward relative to the headrest rear portion 11 by performing an extending and retracting operation between the headrest rear portion 11 and the headrest front portion 12 in response to a driving of the motor 15. The capacitance sensor 16 is provided in the vicinity position of a front surface of the headrest front portion 12 and an capacitance thereof is changed in accordance with an approach of a head of an occupant seated on the vehicle seat 1. The capacitance sensor 16 may be provided at the headrest rear portion 11.

The load sensor 17 is provided at the front surface of the headrest front portion 12. More specifically, the load sensor 17 is provided anterior to the capacitance sensor 16. The load sensor 17 detects a load applied to the headrest front portion 12 by the head of the occupant. According to the embodiment of the present invention, a well known pressure sheet serving as the load sensor 17 is provided at the headrest front portion 12. The pressure sheet includes row electrodes arranged on a row electrode substrate sheet made of polyester film, or the like, and column electrodes arranged on a column electrode substrate sheet. The pressure sheet is formed by laminating the row electrode substrate sheet and the column electrode substrate sheet. A pressure resistance material is interposed between the row electrode substrate sheet and the column electrode substrate sheet. Because the pressure resistance material is interposed between a specific column electrode and a specific row electrode, a resistance value between the both electrodes indicates a value corresponding to a stress applied to a part, in which the both electrodes are intersected, because of a characteristic of the pressure resistance material. Therefore, a pressure at each intersected position can be detected by sequentially measuring the resistance value between each row electrode and each column electrode. Accordingly, an amount of the pressure within a range in which the pressure sheet is provided, i.e., a pressure distribution relative to the pressure sheet can be detected.

The ECU 13 controls the headrest front portion 12 to move the fully expanded position 12B in response to a signal predicting an impact applied to the vehicle as a trigger signal. Further, the ECU 13 controls the motor 15 to stop the headrest front portion 12 when the head of the occupant is detected on the basis of a detected signal from the capacitance sensor 16. In other words, the ECU 13 activates the headrest front portion 12 toward the fully expanded position 12B before the impact is applied from a backside of the vehicle. Then, when the head of the occupant is detected on the basis of the detected signal from the capacitance sensor 16, the ECU 13 controls the motor 15 to stop the headrest front portion 12 at a stop position 12T illustrated in FIG. 2A. In contrast, when the head of the occupant is not detected, the ECU 13 controls the motor 15 to move the headrest front portion 12 toward the fully expanded position 12B and stop at the fully expanded position 12B.

When a completion of a protection of the occupant's head is judged on the basis of the load detected by the load sensor 17 in a condition where the headrest front portion 12 is stopped at the stop position 12T or the fully expanded position 12B, the ECU 13 controls the motor 15 to move the headrest front portion 12 to the fully retracted position 12A.

An operation of the headrest front portion 12 will be explained with reference to FIGS. 2A-2D and FIG. 3. A relation between the head of the occupant and the headrest apparatus 10 in a condition where the impact from the backside is applied to the vehicle is sequentially illustrated in FIGS. 2A-2D. Further, a change of the load applied to the front surface of the headrest front portion 12 (load sensor 17) from the head of the occupant is illustrated in FIG. 3.

Figure 2A:
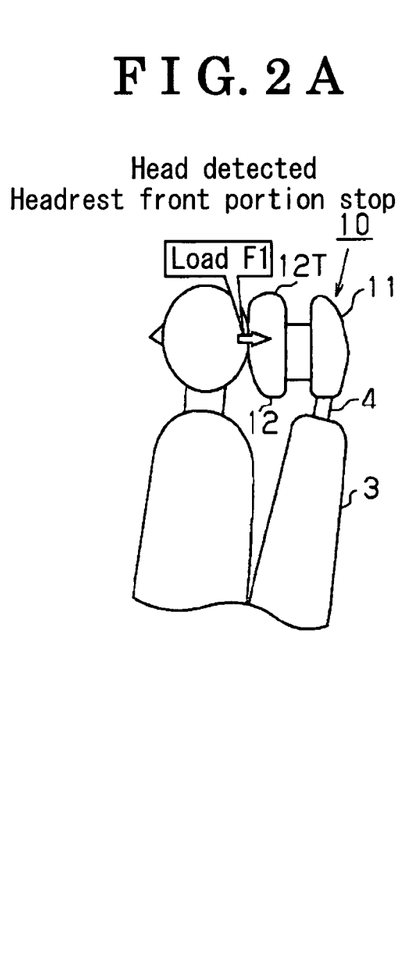
FIG. 2A is a side view of the headrest apparatus in a condition where a head of an occupant is detected.
Figure 2B:
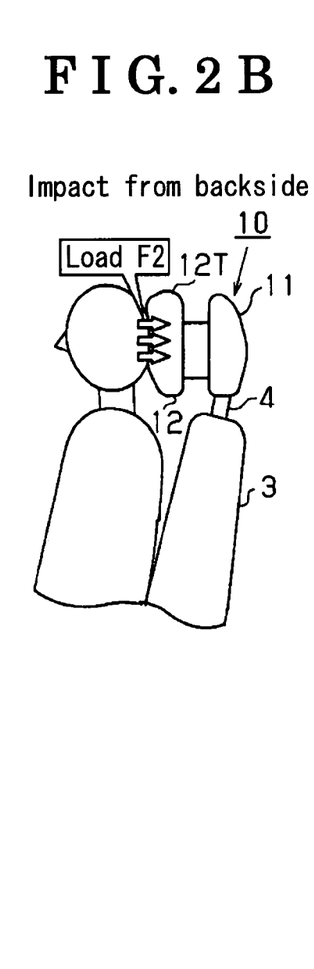
FIG. 2B is a side view of the headrest apparatus in a condition where an impact from a backside is applied to the vehicle.
Figure 2C:
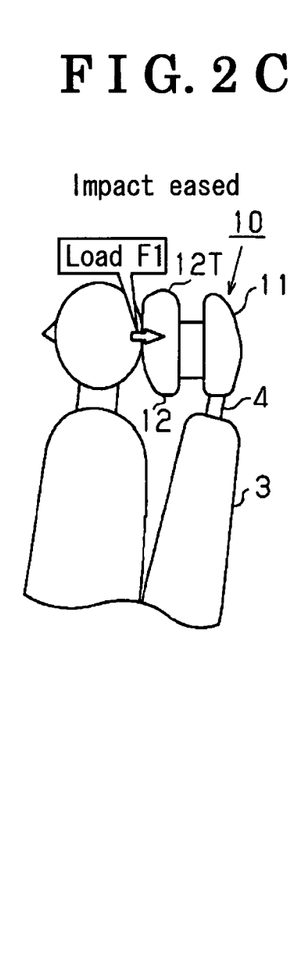
FIG. 2C is a side view of the headrest apparatus in a condition where the impact from the backside of the vehicle is eased.
Figure 3:
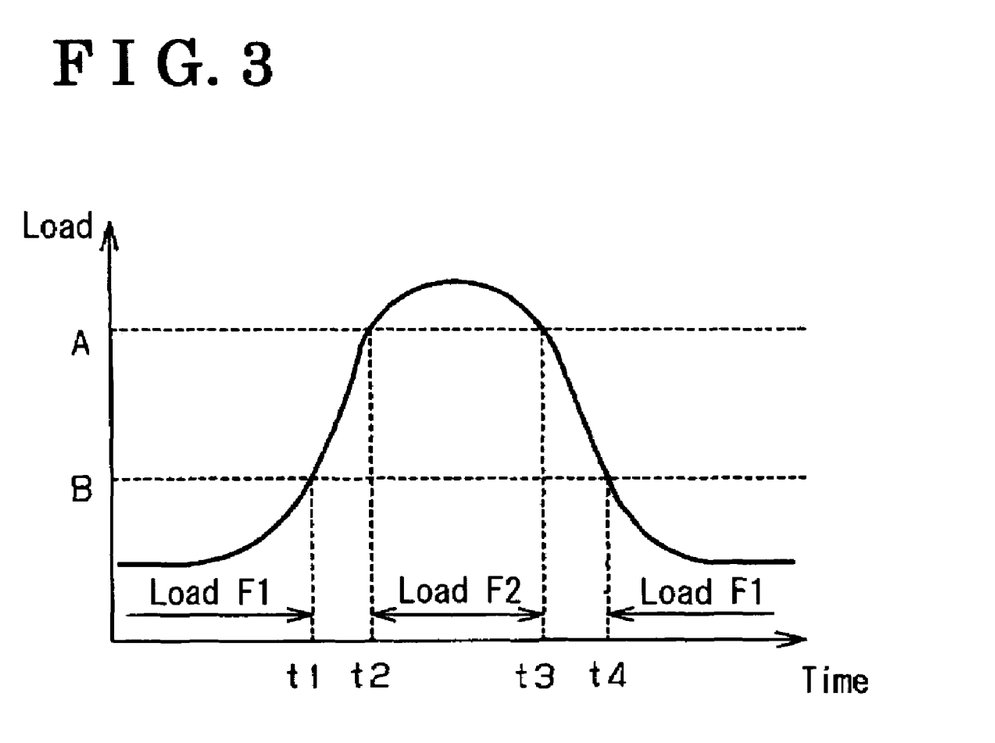
FIG. 3 is a graph for explaining a change of a load detected by a load sensor.

As illustrated in FIG. 2A, when the impact relative to the vehicle from the backside is predicted based on the impact prediction device 19, the headrest front portion 12 moves toward the head of the occupant and stops at the stop position 12T. On this occasion, the load applied to the headrest front portion 12 because of the head of the occupant (hereinafter, referred as a head load) is a head load F1 under normal driving circumstances (i.e., a normal condition where the impact form the backside is not applied to the vehicle). With reference to FIG. 3, the head load F1 applied to the headrest front portion 12 is a condition before time t1.

Then, when the impact from the backside is applied to the vehicle, the head of the occupant is pushed to the headrest front portion 12 and the load, applied to the headrest front portion 12 because of the head of the occupant, becomes a head load F2 which is larger than the head load F1. When the load detected by the load sensor 17 exceeds a first predetermined load (i.e. a first predetermined load A illustrated in FIG. 3), the CPU 21 judges that the load applied to the headrest front portion 12 becomes the head load F2 which is generated when the impact is applied to the vehicle. With reference to FIG. 3, the head load F2 applied to the headrest front portion 12 is placed between time t2 and time t3.

Figure 2D:
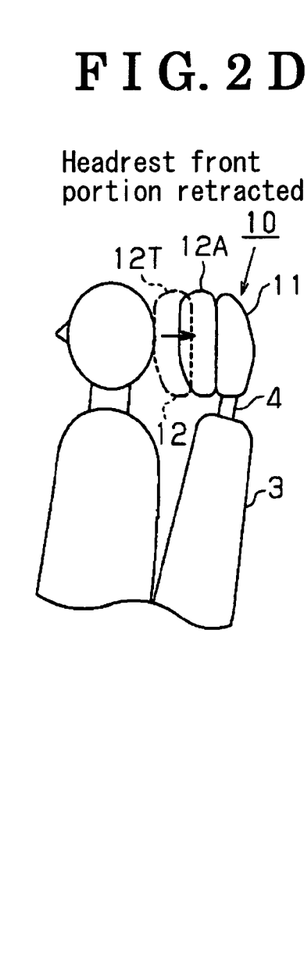
FIG. 2D is a side view of the headrest apparatus in a condition where a headrest front portion is retracted.

When the impact relative to the vehicle from the backside is eased, the load applied to the headrest front portion 12 becomes the head load F1. When the load detected by the load sensor 17 becomes less than a second predetermined load (i.e., a second predetermined load B illustrated in FIG. 3), the CPU 21 judges that the impact relative to the vehicle is eased and the load applied to the headrest front portion 12 becomes the head load F1 under the normal driving circumstances. With reference to FIG. 3, the head load F1 applied to the headrest front portion 12 is a condition after time t4. As illustrated in FIG. 2D, the ECU 13 controls the headrest front portion 12 to move the fully retracted position 12A when it is judged that the impact relative to the vehicle is eased.

In FIGS. 2A-2D, an explanation is made on a condition where the headrest front portion 12 is stopped at the stop position 12T in which the headrest front portion 12 is placed close to the head of the occupant. However, the completion of the protection of the occupant's head by means of the headrest front portion 12 can also be judged in a condition where the headrest front portion 12 is moved and stopped at the fully expanded position 12B.

Further, the CPU 21 judges that the protection of the head of the occupant by moving the headrest front portion 12 is completed also in a condition which a certain period of time is elapsed after the headrest front portion 12 stops at the stop position 12T or the fully expanded position 12B.

When the impact relative to the vehicle from the backside is not detected after the headrest front portion 12 stops at the stop position 12T or the fully expanded position 12B, i.e., when the load detected by the load sensor 17 does not exceed the first predetermined load A, the ECU 13 moves the headrest front portion 12 to the fully retracted position 12A after the certain period time is elapsed.

Figure 4:
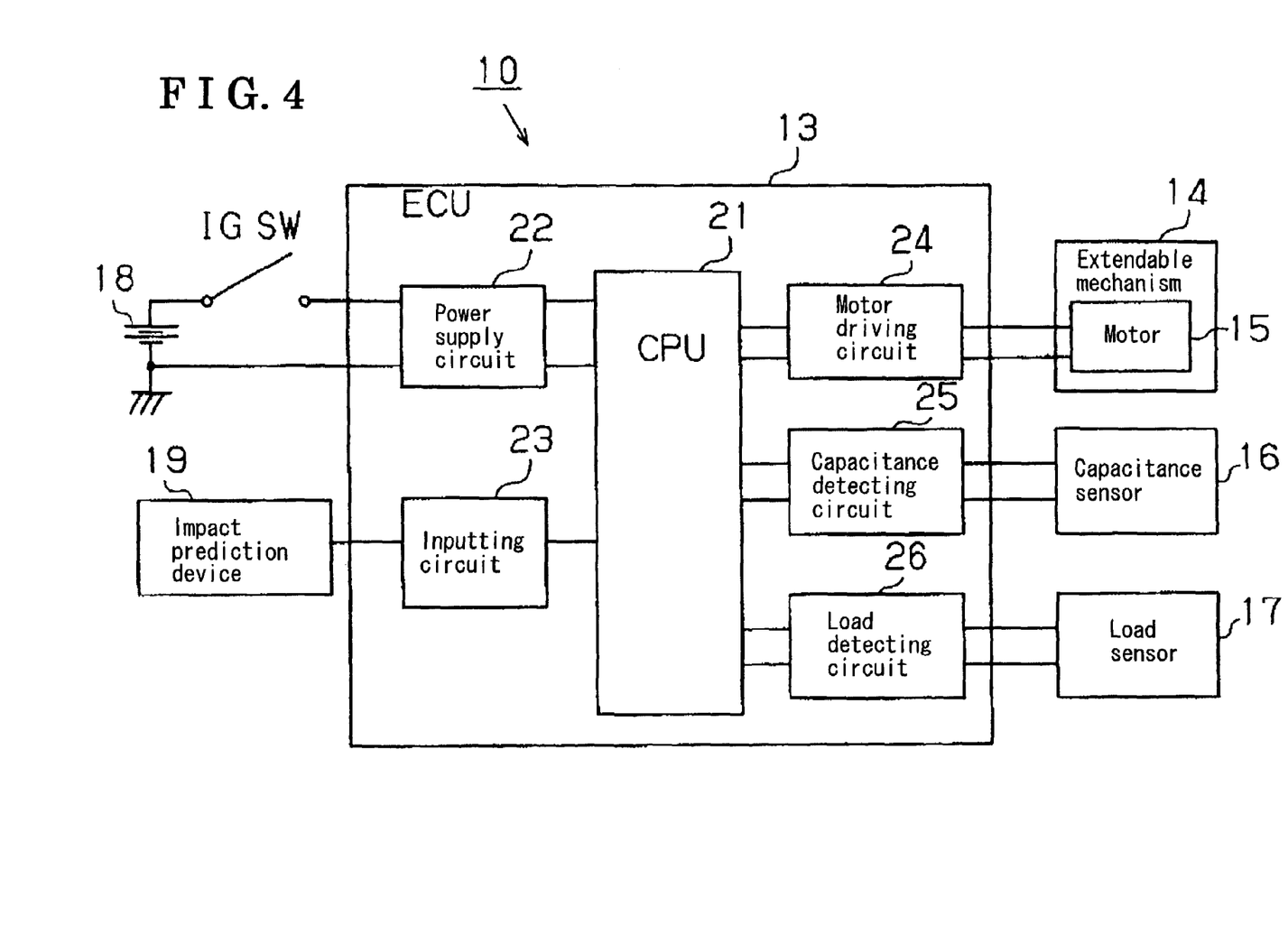
FIG. 4 is a block diagram indicating an electrical structure of the headrest apparatus.

An electrical structure of the headrest apparatus 10 will be explained hereinafter. As illustrated in FIG. 4, the headrest apparatus 10 includes the ECU 13 connecting to the motor 15, the capacitance sensor 16, the load sensor 17, a battery 18, and an impact prediction device 19.

The ECU 13 includes the CPU 21 serving as a controller, the CPU 21 is connected to a power supply circuit 22, a inputting circuit 23 for inputting a vehicle information concerning to a surrounding vehicle, a motor driving circuit 24, an capacitance detecting circuit 25, and a load detecting circuit 26.

The CPU 21 is connected to the battery 18 via an ignition switch (IG SW) and is supplied with a power source from the battery 18 via the power supply circuit 22. The headrest apparatus 10 is applied with the power by switching operation of the ignition switch (IG SW).

The CPU 21 is connected to the impact prediction device 19 via the inputting circuit 23 and receives a vehicle information (e.g., an information concerning to an approaching object (e.g. approaching vehicle) from the backward of the vehicle) from the impact prediction device 19. The impact prediction device 19 is a radar device (not shown) provided on a bumper at a rear portion of the vehicle. The impact prediction device 19 determines a relative speed/distance for a subsequent vehicle (e.g. approaching vehicle) to a preceding vehicle in a comprehensive manner by inputting a signal from the radar device and judges if there is a possibility that the subsequent vehicle crashes against the vehicle. Then, the impact prediction device 19 outputs a result to the inputting circuit 23.

The CPU 21 is connected to the motor 15 via the motor driving circuit 24 which controls a driving of the motor 15. The CPU 21 controls the motor driving circuit 24 for moving the motor 15. The CPU 21 is connected to the capacitance sensor 16 via the capacitance detecting circuit 25. The capacitance detecting circuit 25 judges whether or not the head of the occupant approaches the capacitance sensor 16 on the basis of the signal from the capacitance sensor 16. Then, the capacitance detecting circuit 25 outputs the result to the CPU 21.

The CPU 21 is connected to the load sensor 17 via the load detecting circuit 26. The load detecting circuit 26 detects the load by converting the signal detected by the load sensor 17. Then, the load detecting circuit 26 outputs the result to the CPU 21.

When the CPU 21 receives approaching information of the vehicle from the backside of the vehicle (an impact predicting information) by the inputting circuit 23, the CPU 21 controls the motor driving circuit 24 to move the headrest front portion 12 to the fully expanded position 12B.

When the CPU 21 detects that the head of the occupant approaches the headrest front portion 12 on the basis of the detected signal from the capacitance detecting circuit 25, the CPU 21 controls the motor driving circuit 24 to stop the headrest front portion 12. In contrast, when the approach of the head is not detected based on the capacitance sensor 16 during a movement of the headrest front portion 12, the CPU 21 moves the headrest front portion 12 to the fully expanded position 12B.

Then, when the CPU 21 judges that the protection of the head of the occupant by means of the headrest front portion 12 is completed on the basis of a load signal from the load detecting circuit 26, the CPU 21 controls the motor driving circuit 24 to move the headrest front portion 12 to the fully retracted position 12A.

Processes performed by the ECU 13 of the headrest apparatus 10 will be explained hereinafter. As illustrated process in FIG. 5, the CPU 21 judges if the object (e.g. approaching vehicle) is approaching from the backward of the vehicle on the basis of the signal from the impact prediction device 19 in step 100. When the approach of the object from the backward of the vehicle is not detected (step 100: NO), the CPU 21 is waiting until the approach of the object from the backward of the vehicle is detected in step 100. In contrast, when the approach of the object from the backward of the vehicle is detected (step 100: YES), the process progresses to step 110 and CPU 21 outputs an instruction to control a movement of headrest front portion 12 forward. Then, the process progresses to step 120 and the CPU 21 judges whether or not the head of the occupant is detected on the basis of the signal detected by the capacitance sensor 16. When the head of the occupant is detected (step 120: YES), the process progresses to step 130 and the CPU 21 outputs an instruction to stop the headrest front portion 12. On this occasion, the headrest front portion 12 stops at the stop position 12T illustrated in FIG. 2A in which the head of the occupant is placed close to the headrest front portion 12.

Figure 5:
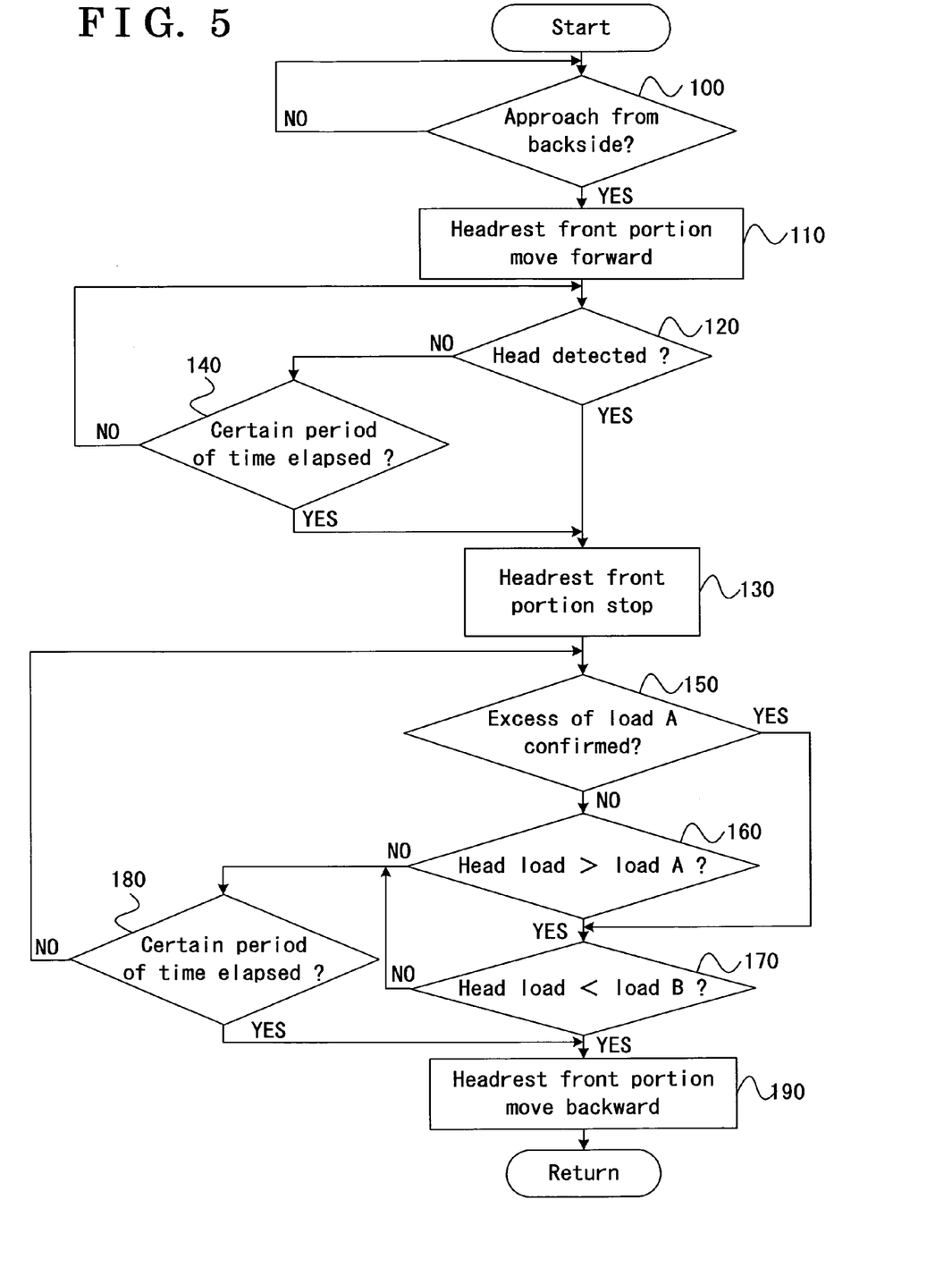
FIG. 5 is a flow chart for explaining processes performed by an controller.

When the head of the occupant is not detected (step 120: NO), the process progresses to step 140 and the CPU 21 judges whether or not the certain period of time (or a predetermined time) is elapsed from a start of the movement of the headrest front portion 12. If the certain period of time is not elapsed (step 140: NO), the process returns to step 120. In contrast, when the certain period of time has elapsed (step 140: YES), the process progresses to step 130 and the CPU 21 outputs the instruction to stop the headrest front portion 12. The certain period of time in step 140 is a operation time required for moving the headrest front portion 12 from the fully retracted position 12A to the fully expanded position 12B. On this occasion, the headrest front portion 12 stops at the fully expanded position 12B.

After a stop of the headrest front portion 12 in step 130, the process progresses to step 150 and the CPU 21 judges if it is already confirmed that the head load applied to the headrest front portion 12 because of the head of the occupant exceeds the first predetermined load A as shown in FIG. 3. When the CPU 21 judges that an excess of the head load applied to the headrest front portion 12 is not yet confirmed (step 150: NO), the process progresses to step 160 and the CPU 21 judges whether or not the head load exceeds the first predetermined load A. Then, when the head load does not exceed the first predetermined load A (step 160: NO), the process progresses to step 180. On this occasion, an impact load serving as the head load (head load F2 illustrated in FIG. 2B) is not detected and the impact load is placed before the time t2 in FIG. 3.

When the head load exceeds the first predetermined load A, the process progresses to step 170 and the CPU 21 judges whether or not the head load is less than the second predetermined load B. In a condition where the head load, which works against the head of the occupant, exceeds the first predetermined load A, the head load does not become less then the second predetermined load B. Therefore, the CPU 21 judges whether or not the head load is not less than the second predetermined load B (step 170: NO) and the process progresses to step 180. On this occasion, the impact load is detected for the first time as the head load and is the impact load in a condition after the time t2 in FIG. 3.

The CPU 21 judges whether or not the predetermined time is elapsed after the stop of the headrest front portion 12 in step 180. When the predetermined time is not elapsed, the process returns to step 150. In contrast, when the predetermined time is elapsed (step 180: YES), the process progresses to step 190 and the CPU 21 output the instruction to move the headrest front portion 12 backward. Then, the process performed by the CPU 21 is repeated by a predetermined cycle. The predetermined time in step 180 is determined based on a time required for sufficiently protecting the head of the occupant by stopping the headrest front portion 12.

When the CPU 21 confirms that the head load exceeds the first predetermined load A in step 150 (step 150: YES), the process progresses to step 170 and the CPU 21 judges whether or not the head load is less than the second predetermined load B. When the head load exceeds the second predetermined load B (step 170: NO), the process progresses to step 180 and performs a series of processes after step 180 as described above. On this occasion, the impact load is not eased after the detection of the impact load (i.e., the head load) and the impact load is placed between the time t2 and the time t4 in FIG. 3.

When the head load is less than the second predetermined load B (step 170: YES), the process progresses to step 190 and the CPU 21 outputs the instruction to move the headrest front portion 12 backward. Then, the processor performed by the CPU 21 in one cycle is terminated. On this occasion, the impact load is eased and becomes a normal driving load after the head load once becomes the impact load. The impact load on this occasion is in a condition after the time t4 in FIG. 3. During the operation of the headrest apparatus 10, the CPU 21 repeats the processes of steps 100-190.

With the configuration of the headrest apparatus 10 according to the embodiment of the present invention, the headrest front portion 12 returns to the fully retracted position 12A when the completion of the protection of the occupant's head by means of the headrest front portion 12 is judged on the basis of the load applied to the headrest front portion 12 by the head of the occupant. Thus, the head of the occupant is protected by the movement of the headrest front portion 12. Further, because the headrest front portion 12 is returned at the fully retracted position 12A when the normal driving is restarted after the impact is applied to the vehicle by the approaching vehicle, the headrest front portion 12 is no longer hindering the driving ability of the occupant.

With the configuration of the headrest apparatus 10 according to the embodiment of the present invention, when the load, applied to the headrest front portion 12 by moving the head of the occupant, becomes less than the second predetermined load B after exceeding the first predetermined load A, the CPU 21 is judged that the protection of the head of the occupant by means of the headrest front portion 12 is completed. Therefore, by setting the first predetermined load A and the second predetermined load B, the headrest front portion 12 can optimally be operated. More specifically, the head load in a condition where the impact is applied from the backside of the vehicle exceeds the predetermined load A. Further, the head load applied to the headrest front portion 12 under the normal driving is less than the second predetermined load B.

With the configuration of the headrest apparatus 10 according to the embodiment of the present invention, the completion of the protection of the occupant's head by means of the headrest front portion 12 is judged when the certain period of time has elapsed after the headrest front portion 12 is stopped at the stop position 12T or the fully expanded position 12B. Therefore, when the certain period of time is set for sufficiently protecting the head of the occupant, the headrest front portion 12 can be prevented from needlessly being protruded and hindering the driving ability of the occupant.

Further, even when the load applied to the headrest front portion 12 does not exceed the first predetermined load A, e.g. in a condition where the protection of the head is not required, the headrest front portion 12 is retracted to the fully retracted position 12A after the certain period of time has elapsed since the headrest front portion 12 is stopped. Therefore, the headrest front portion 12 can be prevented from being protruded and hindering the driving ability of the occupant.

The embodiment of the present invention is not limited to the particular embodiment disclosed above. Variations and changes may be made by others as follows.

According to the embodiment of the present invention, when the load applied to the headrest front portion 12 because of the head of the occupant (i.e., the head load) becomes less than the second predetermined load B after the head load once exceeds the first predetermined load A, the ECU 13 judges that the protection of the head of the occupant by means of the headrest front portion 12 is completed. However, a way of judging the completion of the protection of the occupant's head by means of the headrest front portion 12 is not limited thereto. Alternatively, or in addition, the ECU 13 may judge that the protection of the occupant's head, by means of the headrest front portion 12, is completed when the load received from the load sensor 17 becomes less than the second predetermined load B after an impact prediction from the backside of the vehicle is detected on the basis of the detected signal from the impact prediction device 19.

According to the embodiment of the present invention, the pressure sheet is used as the load sensor 17. However, the present invention is not limited thereto. The present invention is applicable as long as the load applied to the headrest front portion 12 because of the head of the occupant can be detected. Alternatively, or in addition, the load sensor for detecting the load on the basis of a deflection amount of a distortion gauge may be used as the load sensor 17.

The first predetermined load A and the second predetermined load B can freely be set. The present invention is applicable as long as the load more than the first predetermined load A represents the head load at the time of receiving the impact from the backside of the vehicle and the load less than the second predetermined load B represents the head load under the normal driving.

According to the embodiment of the present invention, the vehicle seat 1 providing the headrest apparatus 10 is applied to the passenger seat. However, the present invention is not limited thereto. Alternatively, or in addition, the vehicle seat 1 providing the headrest apparatus 10 may be applied to other seats of the vehicle such as a driver seat, a backseat, or the like.

According to the embodiment of the present invention, when the completion of the protection of the occupant's head by means of the headrest front portion is judged on the basis of the load applied to the headrest front portion because of the head of the occupant, the headrest front portion is returned to the fully retracted position. Therefore, the head of the occupant is protected by the headrest front portion. Further, because the headrest front portion is returned at the fully retracted position when the normal driving is resumed after the impact was applied to the vehicle, the headrest front portion can be prevented from being protruded and hindering the driving ability of the occupant.

According to the embodiment of the present invention, when the load applied to the headrest front portion because of the head of the occupant becomes less than the second predetermined load after exceeding the first predetermined load, it is judged that the protection of the head of the occupant by means of the headrest front portion is completed. Therefore, by setting the first predetermined load and the second predetermined load, the headrest front portion can optimally be operated. More specifically, the first predetermined load is set such that the load in a condition where the impact is applied from the backside of the vehicle exceeds the predetermined load. Further, the second predetermined load is set such that the load applied to the headrest front portion under the normal driving is less than the second predetermined load.

According to the embodiment of the present invention, the completion of the protection of the occupant's head by means of the headrest front portion is judged when the certain period of time has elapsed after the headrest front portion is stopped at the stop position or the fully expanded position. Therefore, when the certain period of time is set for sufficiently protecting the head of the occupant, the headrest front portion can be prevented from needlessly being protruded and hindering the driving ability of the occupant.

According to the embodiment of the present invention, even in a condition where the protection of the head is not required, the headrest front portion is retracted to the fully retracted position after the certain period of time has elapsed since the headrest front portion is stopped. Therefore, the headrest front portion can be prevented from being protruded and hindering the driving ability of the occupant. On this occasion, the controller may judge the completion of the protection of the occupant's head by means of the headrest front portion when the headrest front portion is moved and stopped at the fully expanded position. Further, the controller may return the headrest front portion to the fully retracted position after the certain period of time has elapsed since the headrest front portion is moved to the fully expanded position. The certain period of time may be a time required for moving the headrest front portion from the fully retracted position to the fully expanded position. Further, in a condition where the head load does not exceed the first predetermined load, the controller may retract the headrest front portion to the fully retracted position after the certain period of time has elapsed since the headrest front portion is stopped. Moreover, the load sensor may be provided anterior to the capacitance sensor provided at the headrest front portion and may detect the load applied to the headrest front portion because of the head of the occupant.

With the configuration of the headrest apparatus according to the present invention, the head of the occupant can be protected without hindering the driving ability of the occupant due to the front portion of a headrest.

The principles, preferred embodiment and mode of operation of the present invention have been described in the foregoing specification. However, the invention which is intended to be protected is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A headrest apparatus, comprising:
a headrest rear portion supported at a seatback;
a headrest front portion movable between a fully retracted position, which is close to the headrest rear portion, and a fully expanded position, which is distant from the headrest rear portion;
a driving means moving the headrest front portion in a retracting or an expanding direction;
an capacitance sensor provided at the headrest front portion and outputting a detection signal representing an capacitance variable in response to an approach of a head of an occupant to the headrest front portion;
a controller moving the headrest front portion toward the fully expanded position on the basis of a trigger signal and controlling the driving means to stop the headrest front portion when the head of the occupant is detected on the basis of the detection signal of the capacitance sensor;
a load sensor detecting a load applied to the headrest front portion in response to a contact of the head of the occupant with the headrest front portion, wherein
the controller judging a completion of a protection of the head of the occupant by the headrest front portion on the basis of the load detected by the load sensor in a condition where the headrest front portion is stopped and controlling the driving means to move the headrest front portion toward the fully retracted position when a completion of the protection of the head of the occupant is judged.

2. The headrest apparatus according to claim 1, wherein the controller determines the completion of the protection of the head of the occupant by the headrest front portion when the load applied to the headrest front portion by the head is less than a second predetermined load, which is lower than a first predetermined load, after the load exceeds the first predetermined load.

3. The headrest apparatus according to claim 2, wherein the controller determines the completion of the protection of the head of the occupant by the headrest front portion when the headrest front portion is moved and stopped at the fully expanded position.

4. The headrest apparatus according to claim 2, wherein the controller moves the headrest front portion to the fully retracted position after the headrest front portion is moved to the fully expanded position and then a predetermined time is elapsed.

5. The headrest apparatus according to claim 2, wherein the controller retracts the headrest front portion to the fully retracted position after the predetermined time is elapsed since the headrest front portion is stopped in a condition where the load applied to the headrest front portion does not exceed the first predetermined load.

6. The headrest apparatus according to claim 2, wherein the load sensor is provided anterior to the capacitance sensor provided at the headrest front portion and detects the load applied to the headrest front portion by the head of the occupant.

7. The headrest apparatus according to claim 1, wherein the controlling means is inputted with information representing a vehicle rear impact and controls the driving means to move the headrest front portion in the expanding direction, and the controlling means controls the driving means to move the headrest front portion toward the fully retracted position after a predetermined time under a condition in which the vehicle rear impact has not occurred after the stop of the headrest front portion.

8. The headrest apparatus according to claim 7, wherein the predetermined time is determined by moving the headrest front portion from the fully retracted position to the fully expanded position.

9. The headrest apparatus according to claim 1, wherein the trigger signal is a signal predicting the vehicle rear impact.

* * * * *